United States Patent
Kurita et al.

(10) Patent No.: US 12,494,836 B2
(45) Date of Patent: Dec. 9, 2025

(54) RADIO BASE STATION AND TERMINAL

(71) Applicant: NTT DOCOMO, INC., Tokyo (JP)

(72) Inventors: Daisuke Kurita, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 98 days.

(21) Appl. No.: 17/911,952

(22) PCT Filed: Mar. 19, 2020

(86) PCT No.: PCT/JP2020/012492
§ 371 (c)(1),
(2) Date: Sep. 15, 2022

(87) PCT Pub. No.: WO2021/186720
PCT Pub. Date: Sep. 23, 2021

(65) Prior Publication Data
US 2023/0135259 A1    May 4, 2023

(51) Int. Cl.
*H04K 1/10* (2006.01)
*H04B 7/06* (2006.01)
*H04L 27/28* (2006.01)
*H04W 16/28* (2009.01)

(52) U.S. Cl.
CPC ........ *H04B 7/06952* (2023.05); *H04W 16/28* (2013.01)

(58) Field of Classification Search
CPC ......... H04B 7/0695; H04W 16/28; G01S 1/14
USPC ................ 375/260, 346, 219, 220, 295, 316
See application file for complete search history.

(56) References Cited

U.S. PATENT DOCUMENTS

| | | |
|---|---|---|
| 2005/0048921 A1 | 3/2005 | Chung |
| 2006/0238400 A1 | 10/2006 | Brennan et al. |
| 2018/0213413 A1 | 7/2018 | Roy et al. |
| 2019/0029011 A1* | 1/2019 | Yuan .................. G01S 1/14 |
| 2019/0342766 A1 | 11/2019 | Yanagisawa et al. |
| 2020/0015273 A1* | 1/2020 | Zhang ............... H04B 7/088 |

FOREIGN PATENT DOCUMENTS

| | | |
|---|---|---|
| JP | H09-186644 A | 7/1997 |
| WO | 2018/128048 A1 | 7/2018 |

OTHER PUBLICATIONS

Extended European Search Report issued in counterpart European Patent Application No. 20925515.7, mailed on Nov. 20, 2023 (9 pages).
International Search Report issued in PCT/JP2020/012492 on Sep. 24, 2020 (2 pages).
Written Opinion of the International Searching Authority issued in PCT/JP2020/012492 on Sep. 24, 2020 (3 pages).
3GPP TR 38.807 V0.1.0; 3rd Generation Partnership Project; Technical Specification Group Radio Access Network; Study on requirement for NR beyond 52.6 GHz (Release 16) Mar. 2019 (43 pages).

* cited by examiner

*Primary Examiner* — Phuong Phu
(74) *Attorney, Agent, or Firm* — Osha Bergman Watanabe & Burton LLP

(57) ABSTRACT

A BS (100) receives, from UE (200B), terminal location information indicating a location of the UE (200B). The BS (100) selects an antenna beam for the UE (200A) to be transmitted from the BS (100) based on the terminal location information.

4 Claims, 10 Drawing Sheets

RADIO BASE STATION AND TERMINAL

TECHNICAL FIELD

The present disclosure relates to a radio base station and a terminal that support beamforming using an antenna beam.

BACKGROUND ART

The 3rd Generation Partnership Project (3GPP) specifies 5th generation mobile communication system (5G) (which is also called New Radio (NR) or Next Generation (NG)), and specification of a next generation called Beyond 5G, 5G Evolution, or 6G has also been conducted.

In such specification of the next generation, an operation in a higher frequency band (for example, a band beyond 52.6 GHz) is under study (see Non Patent Literature 1).

In such a high frequency band, it is assumed that the number (N) of antenna beams used by a radio base station (BS) is increased and a terminal (user equipment (UE)) supports beamforming (the number M of antennas).

CITATION LIST

Non Patent Literature

Non Patent Literature 1: 3GPP TR 38.807 V0.1.0, 3rd Generation Partnership Project; Technical Specification Group Radio Access Network; Study on requirements for NR beyond 52.6 GHz (Release 16), 3GPP, March 2019

SUMMARY OF INVENTION

As described above, the number of combinations of antenna beams of the BS and the UE is increased as N×M, the BS and the UE each need to instantaneously determine an optimum antenna beam according to a moving state and the like.

In this regard, the following disclosure has been made in view of such a situation, and an object of the following disclosure is to provide a radio base station and a terminal that can rapidly select an appropriate antenna beam even in a case where there are many combinations of antenna beams.

An aspect of the present disclosure is a radio base station (BS 100) including: a receiving unit (radio receiving unit 120) that receives, from a terminal (UE 200A or 200B), terminal location information indicating a location of the terminal; and a control unit (beam control unit 140) that selects an antenna beam for the terminal to be transmitted from the radio base station based on the terminal location information.

An aspect of the present disclosure is a terminal (UE 200A or 200B) including: a receiving unit (radio receiving unit 220) that receives, from a radio base station (BS 100), base station location information indicating a location of the radio base station; and a control unit (beam control unit 240) that selects an antenna beam for the radio base station to be transmitted from the terminal based on the base station location information.

DESCRIPTION OF EMBODIMENTS

Figure 1:
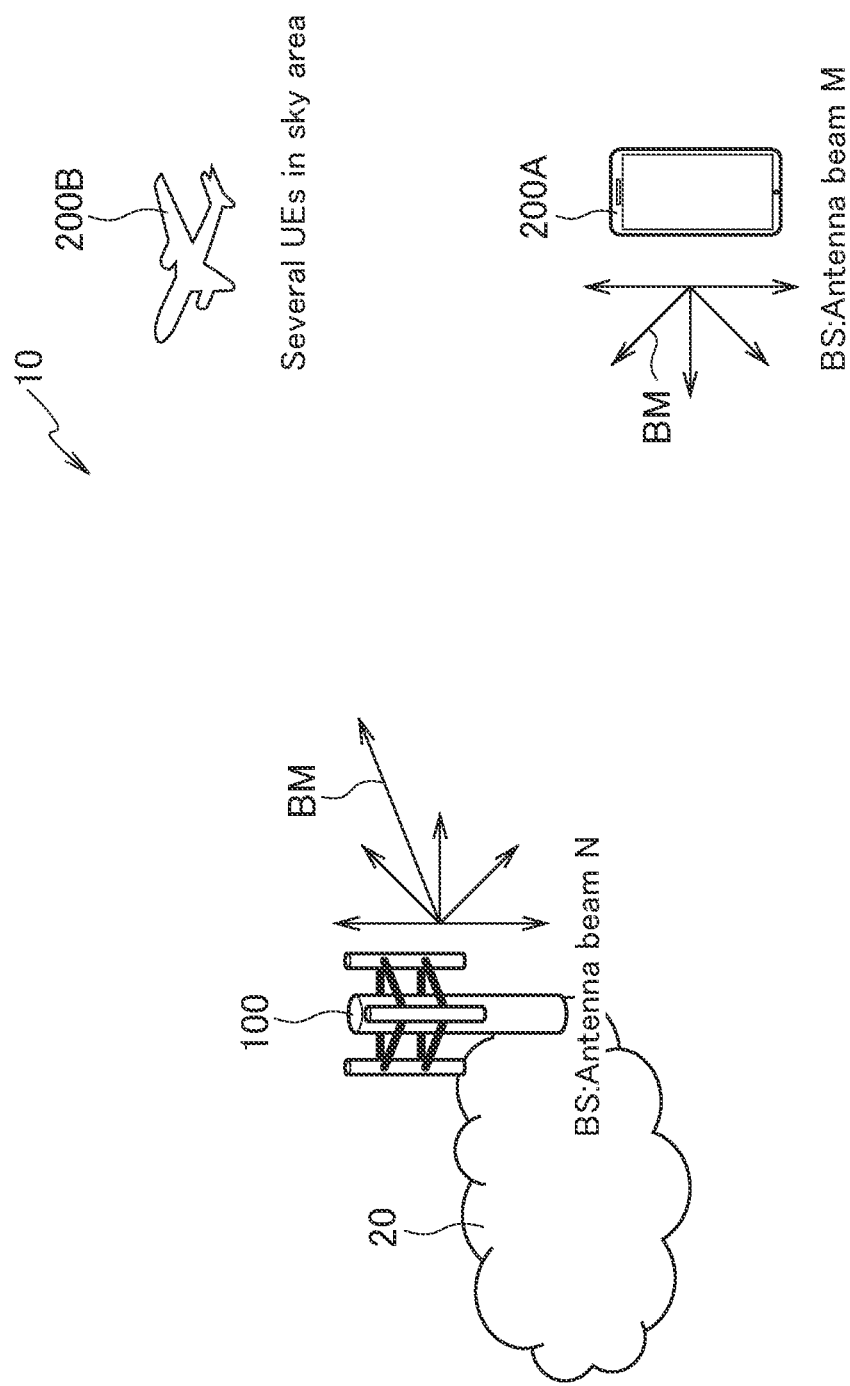
FIG. 1 is an overall schematic configuration diagram of a radio communication system 10.

Hereinafter, embodiments will be described with reference to the drawings. Note that the same functions or configurations are denoted by the same or similar reference numerals, and description thereof is omitted as appropriate.

(1) Overall Schematic Configuration of Radio Communication System

FIG. 1 is an overall schematic configuration diagram of a radio communication system 10 according to the present embodiment. The radio communication system 10 is a radio communication system according to 5G New Radio (NR), and includes a Next Generation-Radio Access Network 20 (hereinafter, referred to as NG-RAN 20), a user terminal 200A (User Equipment 200A) (hereinafter, referred to as UE 200A), and a user terminal 200B (User Equipment 200B) (hereinafter, referred to as UE 200B).

Note that the radio communication system 10 may also be a radio communication system according to a system called Beyond 5G, 5G Evolution, or 6G.

The NG-RAN 20 includes a radio base station 100 (hereinafter referred to as BS 100). Note that a specific configuration of the radio communication system 10 is not limited to the example illustrated in FIG. 1, the specific configuration including the number of BSs and the number of UEs.

The NG-RAN 20 includes a plurality of NG-RAN nodes, specifically, BSs in an actual implementation, and is connected to a core network (5GC) (not illustrated) according to 5G. Note that the NG-RAN 20 and the 5GC may be simply referred to as a network.

The BS 100 is a radio base station according to the NR and performs radio communication according to the NR with the UE 200A and the UE 200B.

Each of the BS 100, the UE 200A, and the UE 200B can support massive multiple-input and multiple-output (MIMO) in which a beam BM with higher directivity is formed, carrier aggregation (CA) in which a plurality of component carriers (CC) are used in bundles, dual connectivity (DC) in which communication is performed between each of a plurality of NG-RAN nodes and the UE at the same time, and the like, by controlling a radio signal transmitted from a plurality of antenna elements.

In the radio communication system 10, a high frequency band higher than a frequency range (FR) specified in Release-15 and 16 of 3GPP may be used. Specifically, the radio communication system 10 may support FR1 and FR2, and a frequency band higher than FR2 may also be used. A frequency band of each FR is as follows.

FR1: 410 MHz to 7.125 GHz
FR2: 24.25 GHz to 52.6 GHz

Particularly, in such a high frequency band, the number (N) of antenna beams used by the BS 100 may be increased. Further, the UE 200A and the UE 200B may apply beamforming using a plurality of antennas (the number (N) of antennas).

Note that the beamforming may be interpreted as a technology of forming a directivity pattern for all of a plurality of antennas by controlling an amplitude and a phase of each of the plurality of antennas to increase/decrease an antenna gain in a specific direction.

As such, in the radio communication system 10, the number of combinations of antenna beams of the BS 100 and the UE 200A or the UE 200B can be increased as N×M. Each of the BS 100, the UE 200A, and the UE 200B can instantaneously determine an optimum antenna beam according to a moving state of the UE or the like.

The UE 200A is a portable UE represented by a smartphone or the like. As described above, the UE 200A can support beamforming (the number of antenna beams: M) using a plurality of antennas (M).

The UE 200B is UE mounted on an aircraft or the like. That is, in the radio communication system 10, a non-terrestrial network (NTN) may be used to incorporate the sky, sea, and an area outside the atmosphere into a coverage area. In the NTN, an aircraft, a ship, or the like on which the UE is mounted can be equipped with a highly accurate global positioning system (GPS). Note that the UE 200B may also support beamforming (the number of antenna beams: M) using a plurality of antennas (M).

(2) Functional Block Configuration of Radio Communication System

Next, a functional block configuration of the radio communication system 10 will be described. Specifically, functional block configurations of the BS 100 and the UE 200A will be described.

(2.1) BS 100

Figure 2:
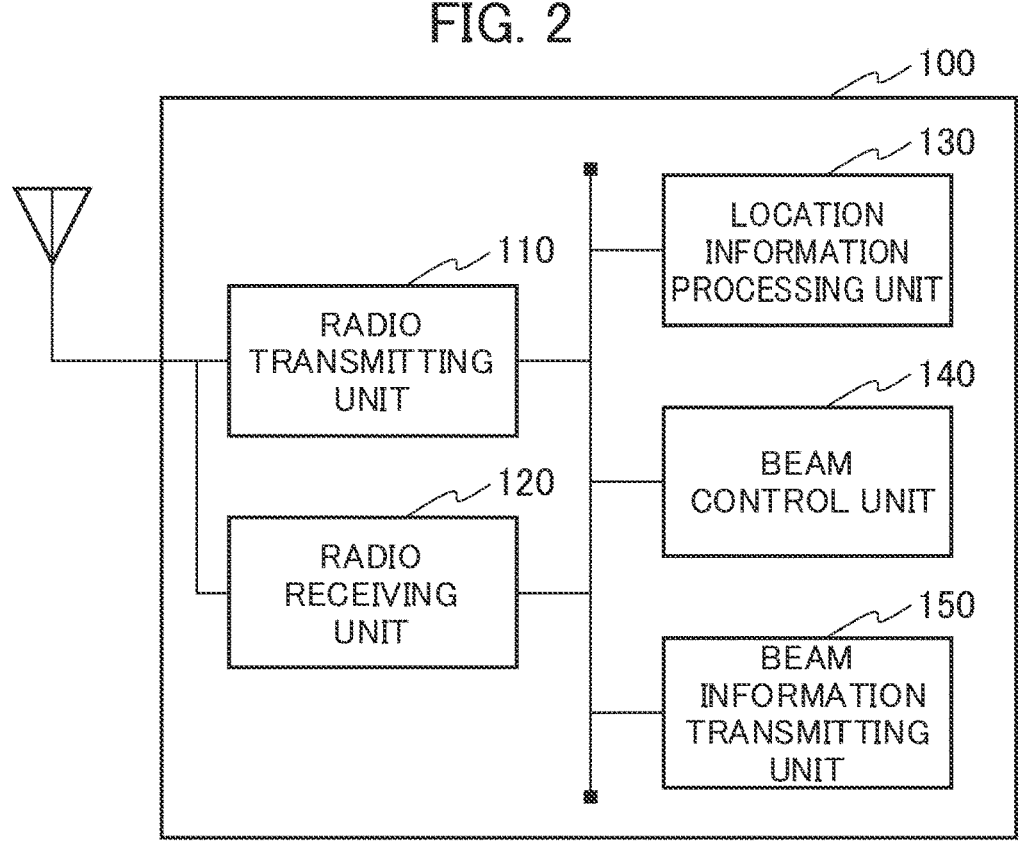
FIG. 2 is a functional block configuration diagram of a BS 100.

FIG. 2 is a functional block configuration diagram of a BS 100. As illustrated in FIG. 2, the BS 100 includes a radio transmitting unit 110, a radio receiving unit 120, a location information processing unit 130, a beam control unit 140, and a beam information transmitting unit 150.

The radio transmitting unit 110 transmits a downlink signal (DL signal) according to the NR. The radio receiving unit 120 receives an uplink signal (UL signal) according to the NR.

In the present embodiment, the radio receiving unit 120 receives terminal location information indicating a location of the UE 200A (or the UE 200B, hereinafter, the same applies) from the UE 200A. In the present embodiment, the radio receiving unit 120 constitutes a receiving unit that receives terminal location information from a terminal.

The location information processing unit 130 performs processing related to the location information of the UE 200A. Specifically, the location information processing unit 130 derives a current location of the UE 200A based on the terminal location information of the UE 200A received via the radio receiving unit 120.

The terminal location information may include a latitude and a longitude that indicate the location of the UE 200A. Furthermore, the terminal location information may include a mobile speed and/or moving direction of the UE 200A. Note that a specific example of processing using the terminal location information will be described later.

The beam control unit 140 controls a beam BM (antenna beam) transmitted from the BS 100. Specifically, the beam control unit 140 can perform beamforming and change a transmission direction of the beam BM (which may be called beam tracking).

Particularly, in the present embodiment, the beam control unit 140 can select an antenna beam for the UE 200A that is to be transmitted from the BS 100, based on the terminal location information of the UE 200A. In the present embodiment, the beam control unit 140 constitutes a control unit that selects an antenna beam for the UE 200A.

For example, the beam control unit 140 may select an antenna beam to be transmitted in a direction closest to a direction in which the UE 200A is located, among N antenna beams.

Note that a specific example in which the antenna beam is controlled will be described later.

The beam information transmitting unit 150 can transmit base station location information indicating a location of the BS 100 to the UE 200A. In the present embodiment, the beam information transmitting unit 150 constitutes a transmitting unit that transmits base station location information to a terminal.

The base station location information may include a latitude and a longitude that indicate the location of the BS 100. Further, the base station location information may include an altitude of the location of the BS 100. Since the BS 100 is basically assumed to be a fixed station, the base station location information may not include a mobile speed and/or moving direction. Meanwhile, it is preferable that the base station location information includes the altitude so that the location of the BS 100 in a height direction can be judged.

Note that, as described above, the terminal location information may not include an altitude. This is because, in general, the UE 200A (for example, a smartphone or the like) is almost located at a location with an extremely low altitude. In a case of UE related to the NTN, like the UE 200B, the terminal location information preferably includes the altitude.

Further, the beam information transmitting unit 150 can transmit, to the UE 200A, change information indicating a change in direction of the antenna beam transmitted by the BS 100. The change information can be transmitted by using downlink control information (DCI), a control element (CE) of a medium access control layer (MAC), and the like.

The change information may indicate, for example, a change in direction of the antenna beam at each predetermined time by using angles ($\Delta\rho$ and $\Delta\sigma$) with respect to a direction of the antenna beam before the predetermined time as reference. A specific example of the change information will be described later.

(2.2) UE 200A

Figure 3:
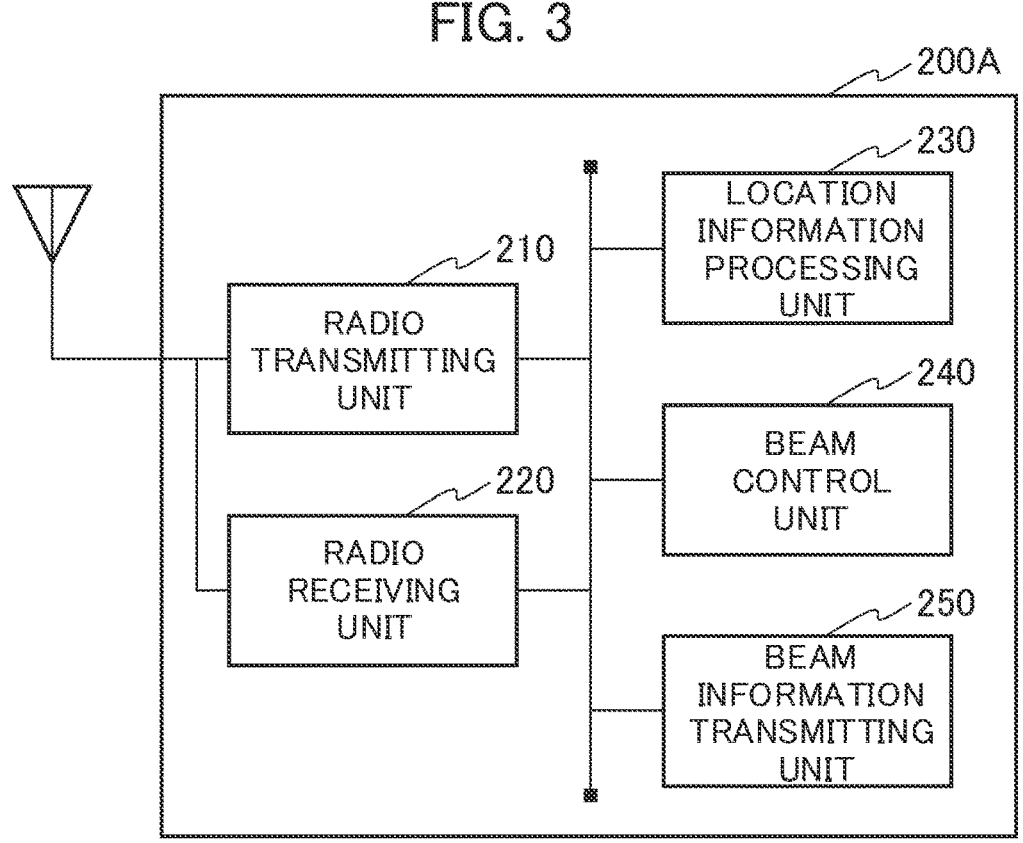
FIG. 3 is a functional block configuration diagram of UE 200A.

FIG. 3 is a functional block configuration diagram of UE 200A. As illustrated in FIG. 3, the UE 200A includes a radio transmitting unit 210, a radio receiving unit 220, a location information processing unit 230, a beam control unit 240, and a beam information transmitting unit 250. Note that the UE 200B also includes the same functional blocks as the UE 200A.

In addition, since the UE 200A includes the same functional blocks as the above-described BS 100, a description of the similar parts will be omitted if appropriate.

The radio transmitting unit 210 transmits an uplink signal (UL signal) according to the NR. The radio receiving unit 220 receives a downlink signal (DL signal) according to the NR.

In the present embodiment, the radio receiving unit 220 receives the base station location information indicating the location of the BS 100 from the BS 100, and in the present embodiment, the radio receiving unit 220 constitutes a receiving unit that receives base station location information from a radio base station.

The location information processing unit 230 corresponds to the location information processing unit 130 of the BS 100. The location information processing unit 230 derives a current location of the BS 100 based on the base station location information of the BS 100 received via the radio receiving unit 220.

The beam control unit 240 corresponds to the beam control unit 140 of the BS 100. The beam control unit 240 can select an antenna beam for the BS 100 transmitted from the UE 200A based on the base station location information of the BS 100. In the present embodiment, the beam control unit 240 constitutes a control unit that selects an antenna beam for the BS 100.

The beam information transmitting unit 250 corresponds to the beam information transmitting unit 150 of the BS 100. The beam information transmitting unit 250 can transmit terminal location information indicating the location of the UE 200A to the BS 100. In the present embodiment, the beam information transmitting unit 250 constitutes a transmitting unit that transmits terminal location information to a radio base station.

(3) Operations of Radio Communication System

Next, operations of the radio communication system 10 will be described. Specifically, an operation in which the BS 100, the UE 200A, and the UE 200B each select an antenna beam by using location information of a counterpart will be described.

(3.1) Overview of Operation

Hereinafter, an operation related to beam tracking utilizing the location information of each of the BS 100, the UE 200A, and the UE 200B will be described.

By using the location information, specifically, the terminal location information and the base station location information, a time required for selecting an optimum antenna beam is shortened.

Operation examples described below have the following contents.

(Operation Example 1): The radio base station (BS 100)/terminal (UE 200A or UE 200B) notifies and reports location information thereof or the like to a counterpart.

Specifically, the BS 100 notifies the UE 200A or the UE 200B of location information (latitude, longitude, and altitude) thereof or the like. In addition, the UE 200A or the UE 200B regularly reports location information (latitude, longitude, speed, moving direction, or the like) thereof or the like to the BS 100.

(Operation Example 2): The radio base station (BS 100)/terminal (UE 200A or UE 200B) selects an antenna beam using the location information.

Specifically, the transmission direction of the antenna beam is determined based on relative positions of the radio base station and the terminal that perform the radio communication.

The radio base station may notify the terminal of location information (latitude/longitude/altitude) thereof and the like by using a physical broadcast channel (PBCH) or the like. Note that, in addition to the PBCH, a control channel such as a physical downlink control channel (PDCCH) or a data channel such as a physical downlink shared channel (PDSCH) may be used.

In addition, the terminal may regularly report location information (latitude, longitude, speed, moving direction, or the like) thereof to the radio base station.

Furthermore, such notification or reporting may be performed by using a frequency or system other than the frequency used for the selection of the antenna beam.

Note that the radio base station does not have to transmit a synchronization signal (SS) of each of all candidate antenna beams for the purpose of selecting an antenna beam. Note that a synchronization signal/broadcast channel block configured with an SS and a physical broadcast channel (PBCH) may be called an SS/PBCH block (SSB).

Further, an occasion for a random access (RA) procedure, specifically, a random access channel (physical random access channel (PRACH)) occasion (PRACH occasion (RO)) does not have to prepare all candidate antenna beams.

(Operation Example 3): The radio base station (BS 100) notifies the terminal (UE 200A or UE 200B) of a change in direction of the antenna beam of the radio base station.

Specifically, the terminal (UE 200A or UE 200B) changes a direction of an antenna beam thereof according to the change in direction of the antenna beam of the radio base station (BS 100).

(3.2) Operation Example

Hereinafter, specific examples of the above-described Operation Examples 1 to 3 will be described.

(3.2.1) Operation Example 1

In this operation example, the radio base station (BS 100)/terminal (UE 200A or UE 200B) notifies and reports location information thereof or the like to a counterpart.

Figure 4:
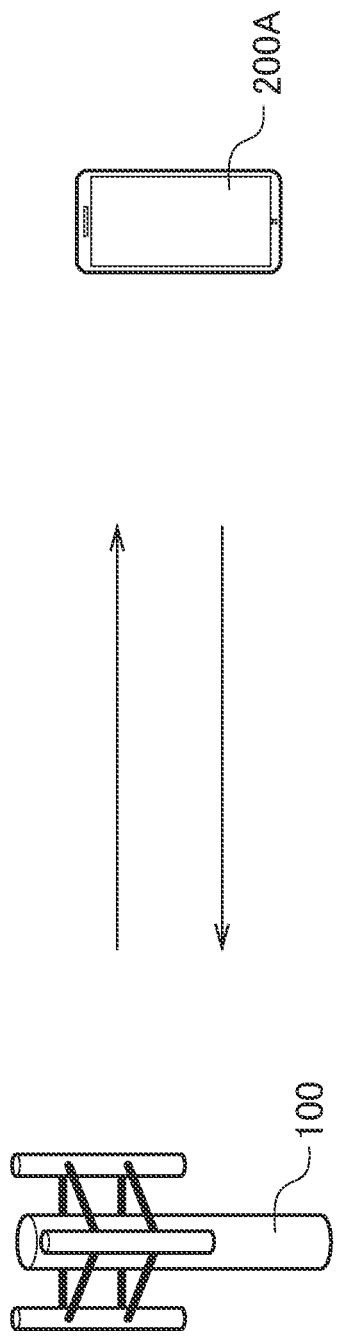
FIG. 4 is a diagram illustrating an example of notification/reporting of location information according to Operation Example 1.

FIG. 4 illustrates an example of notification/reporting of location information according to Operation Example 1. As illustrated in FIG. 4, the BS 100 notifies the terminal (the UE 200A in the example illustrated in FIG. 4) of location information (base station location information) thereof, specifically, a latitude, a longitude, and an altitude.

The notification of the base station location information can be made by using, for example, a System Information Block 1 (SIB1) or a PBCH (which may be an option).

As for the latitude/longitude, in a case of the sexagesimal system, notification of "minute/second" may be made, and in a case of the decimal system, notification of only a value after a decimal point may be made. That is, the UE 200A may assume that a numerical value of "degree" is the same as that thereof.

Alternatively, the UE 200A may assume that location information (terminal location information) thereof cannot be measured, and notification of all numerical values including "degree" may be made.

Similarly, the UE 200A regularly (for example, once in a second) reports location information (terminal location information) thereof, specifically, a latitude, a longitude, a speed, a moving direction, or the like, to the BS 100.

Here, the altitude of the UE 200A may be a fixed value (for example, 1 m). Alternatively, the BS 100 (network) may judge the altitude of the UE 200A based on the location information of the UE 200A. Specifically, the BS 100 may estimate a topographic altitude (in a case where a structure such as a building is present at the location, an altitude (a height of the structure, a half of the height, or the like) based on the structure) of the location based on the information on the movement and the longitude of the UE 200A.

As another method, the terminal location information may include the altitude of the UE 200A. As for the terminal location information, similarly to the base station location information, in a case of the sexagesimal system, notification of "minute/second" may be made, and in a case of the decimal system, notification of only a value after a decimal point may be made. That is, the BS 100 may assume that a numerical value of "degree" is the same as that thereof.

Further, the number of bits used for reporting may be changed depending on a cell range (size) of the BS 100. For example, in a case where the cell range is narrow, only bits corresponding to "seconds" may be used.

(3.2.2) Operation Example 2

In this operation example, the radio base station (BS 100)/terminal (UE 200A or UE 200B) selects an antenna beam using the location information.

Figure 5:
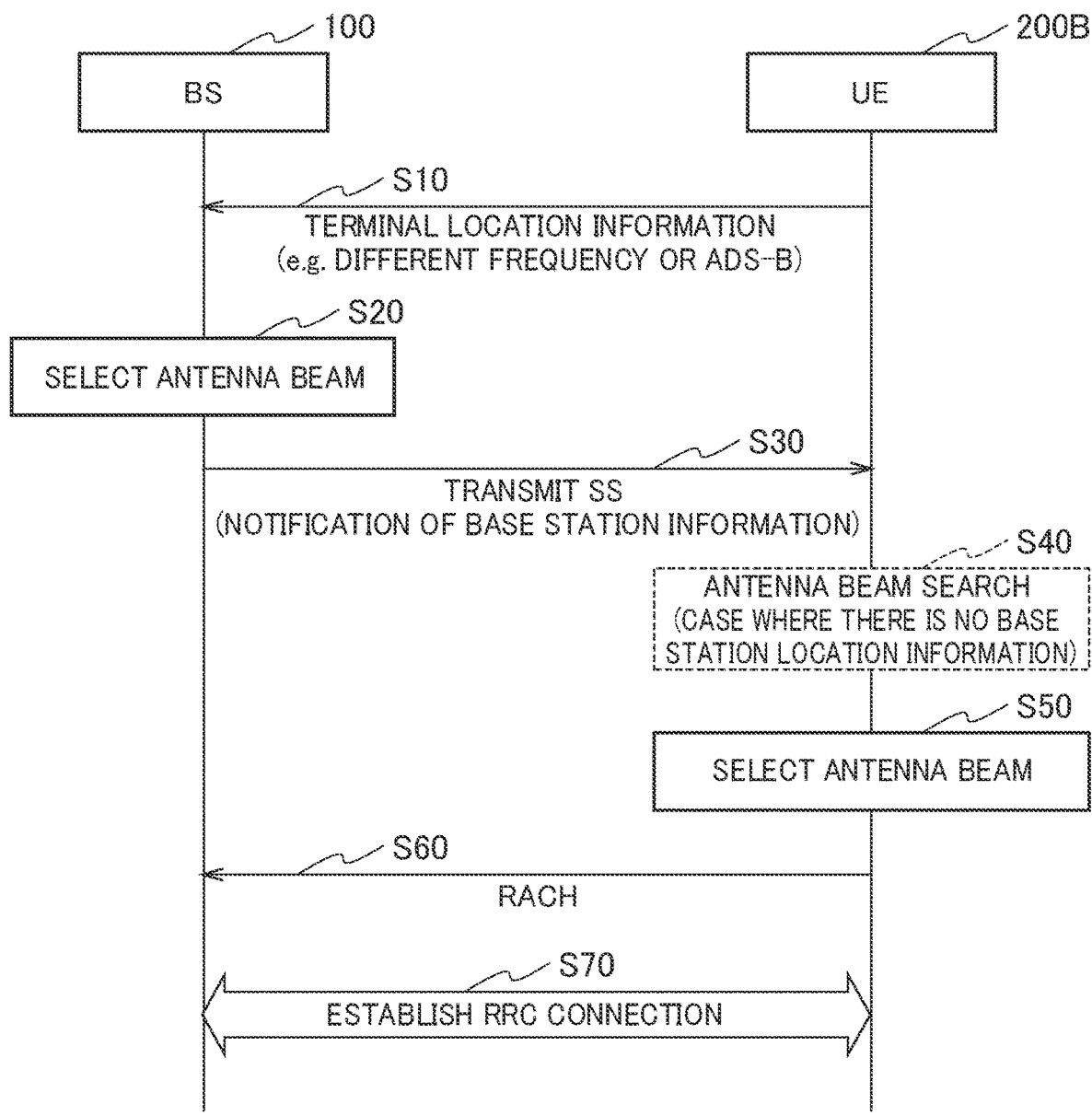
FIG. 5 is a diagram illustrating an antenna beam selection sequence according to Operation Example 2.
Figure 6:
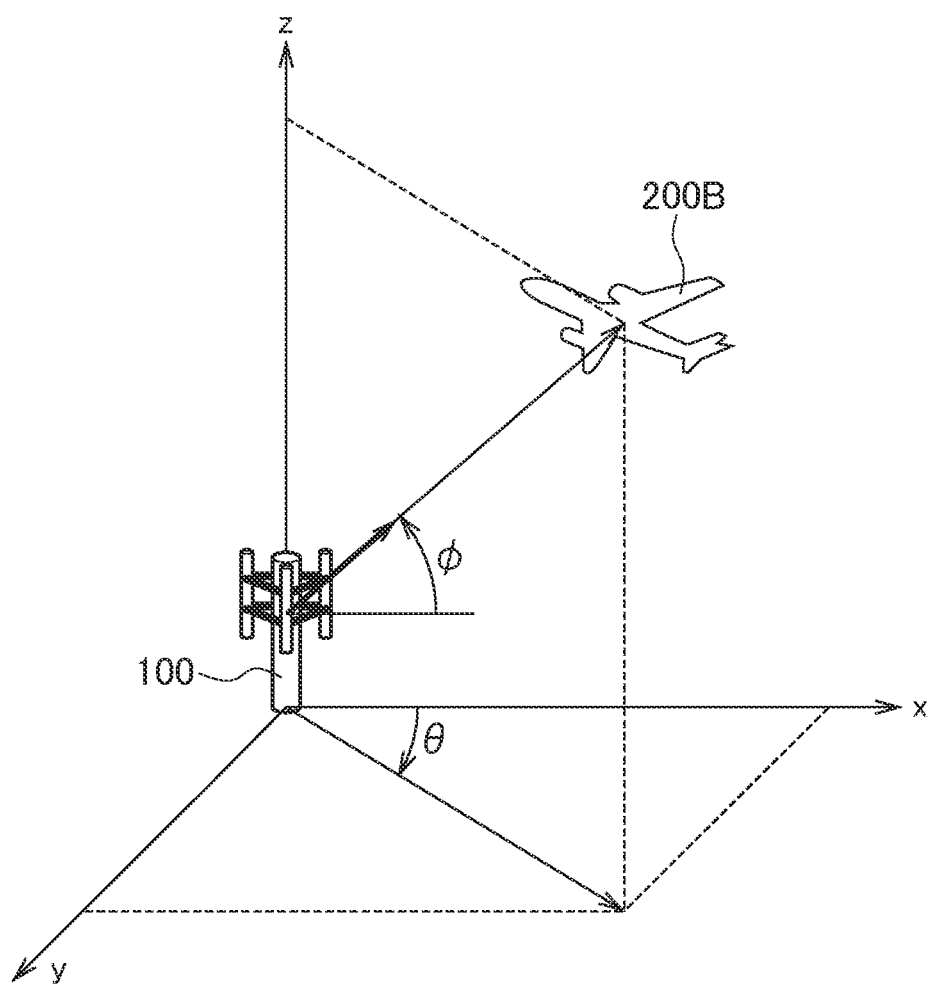
FIG. 6 is a diagram illustrating an example in which the BS 100 selects an antenna beam for UE 200B.

FIG. 5 illustrates an antenna beam selection sequence according to Operation Example 2. FIG. 6 illustrates an example in which the BS 100 selects an antenna beam for the UE 200B.

As illustrated in FIGS. 5 and 6, the terminal (here, the UE 200B) notifies the BS 100 of location information (terminal location information) thereof (S10). As described above, the terminal location information may include a speed and/or moving direction of the UE 200B.

Note that the terminal location information may be based on any of the following.
(i) A location derived based on a Global Navigation Satellite System (GNSS) such as the GPS of the UE 200B is reported (similarly to Operation Example 1). The report may use a frequency or system different from the frequency used for the selection of the antenna beam. For example, in a case of an aircraft such as the UE 200B, automatic dependent surveillance-broadcast (ADS-B) may be used.
(ii) The UE 200B transmits a reference signal for specifying the location of the UE 200B, and the BS 100 specifies the location of the BS 100 based on the reference signal. Note that, as the reference signal, a reference signal such as a positioning reference signal (PRS) specified in 3GPP (Release-16) may be used.
(iii) A combination of (i) and (ii)

The BS 100 selects an antenna beam (horizontal direction: θ, vertical direction: φ, base station antenna beam) to be transmitted by the BS 100 based on the location of the BS 100 and the acquired terminal location information mobile station of the UE 200B (S20).

The BS 100 periodically transmits a synchronization signal (SS) by using the selected base station antenna beam (S30). As described above, the synchronization signal may include the base station location information.

In a case where there is no location information (base station location information) of the BS 100, the UE 200B performs an antenna beam search of the UE 200B and determines an antenna beam for the BS 100 (S40).

In a case where there is location information (base station location information) of the BS 100, the UE 200B selects an antenna beam (mobile station antenna beam) based on the location information (S50).

The UE 200B transmits an RACH (specifically, PRACH) by using the selected mobile station antenna beam (S60). As a result, the random access procedure is performed between the BS 100 and the UE 200B, and a radio resource control layer (RRC) connection is established (S70).

Further, as described above, an initial access may be performed under the assumption that the notification and the reporting of the location information are made by using another system. In this case, the configurations of the SSB and the RACH may be any of (Configuration 1) to (Configuration 3).

(Configuration 1): Case of Fixing Time Resource for SSB/RACH

Figure 7:
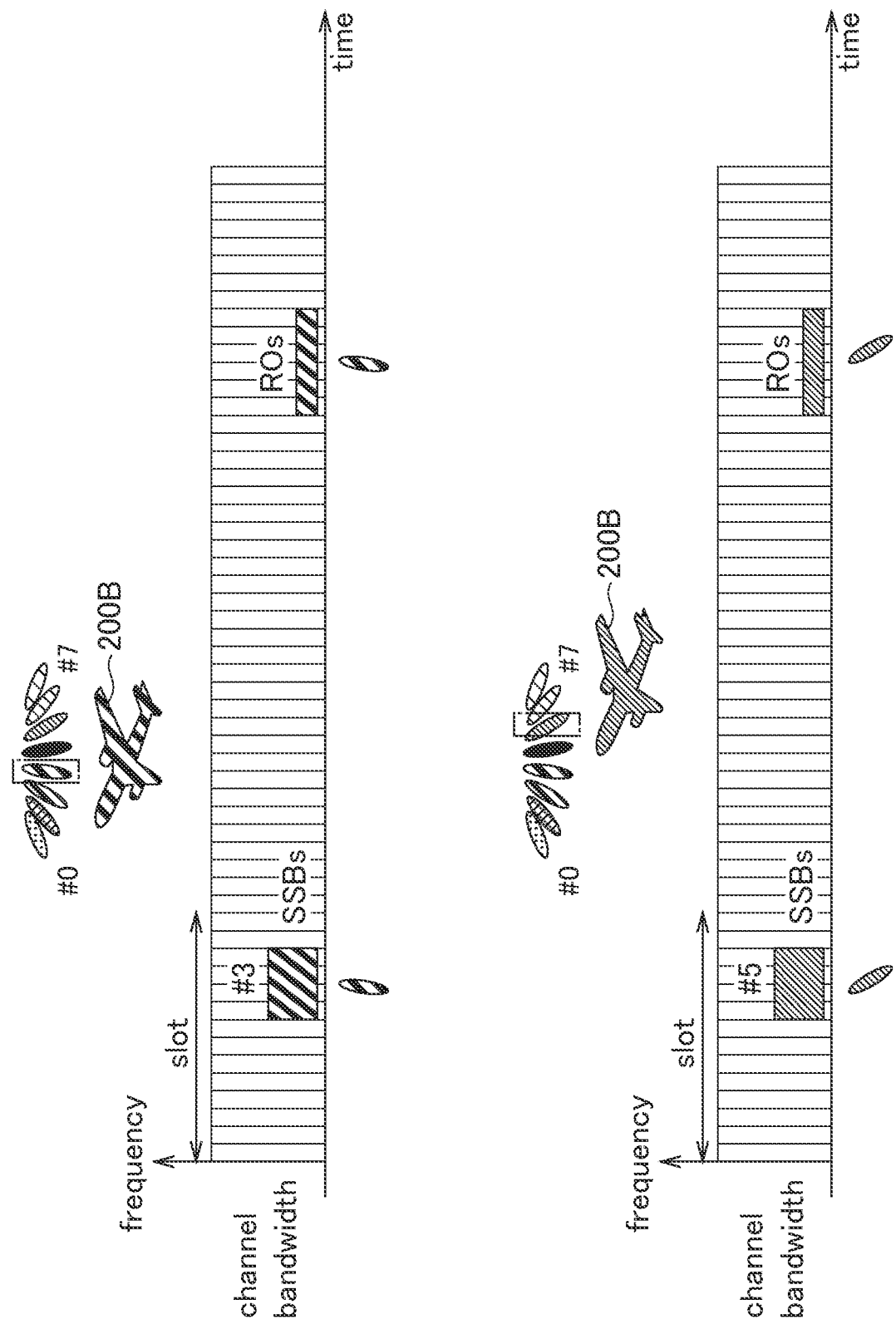
FIG. 7 is a diagram illustrating a configuration example (part 1) of SSB/RACH according to Operation Example 2.

FIG. 7 illustrates a configuration example (part 1) of SSB/RACH according to Operation Example 2. As illustrated in FIG. 7, the BS 100 transmits only the selected base station antenna beam.

Therefore, even with the same time resource, SSB identification information (SSB index) to be transmitted differs depending on the selected base station antenna beam. Further, as illustrated in FIG. 7, in a case where the direction of the UE 200B is changed, the SSB index to be transmitted may also be changed.

FIG. 7 illustrates an example in which SSBs (SSB indexes) #3 to #5 and corresponding ROs are sequentially selected as the UE 200B moves.

Note that an SSB transmission period may be, for example, 5, 10, 20, 40, 80, or 160 msec.

As for the RACH, the RACH configuration corresponding to the SSB allocated to the same time resource may always be the same, regardless of the SSB index.

In a case where the UE 200B moves, and the BS 100 changes the base station antenna beam during the random access procedure, the BS 100 recognizes the change based on the terminal location information, and may change the SSB index even during the random access procedure. Here, time and frequency resources allocated to the random access procedure do not have to be changed.

Figure 8:
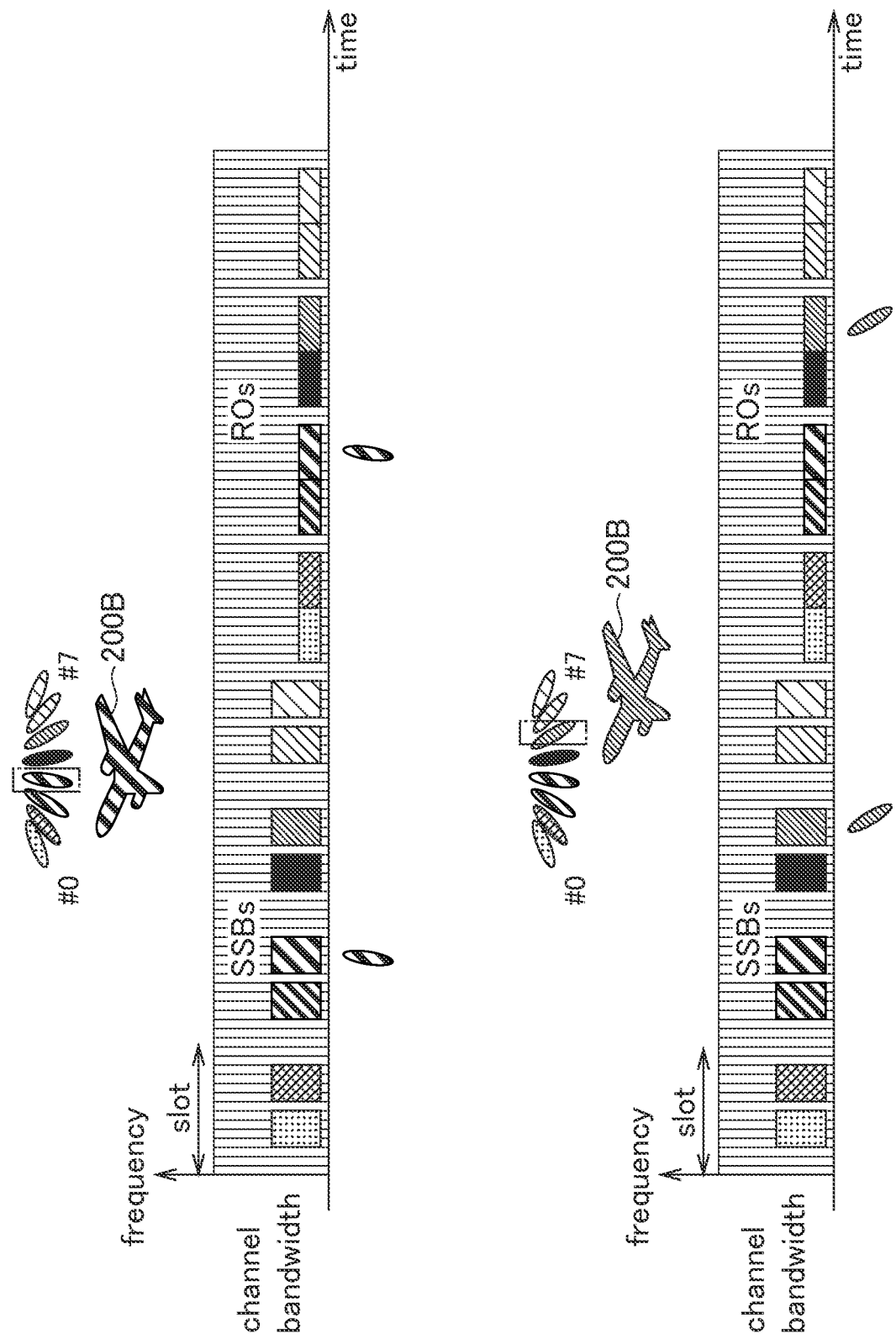
FIG. 8 is a diagram illustrating a configuration example (part 2) of the SSB/RACH according to Operation Example 2.

(Configuration 2): Case of Associating Time/Frequency Resources for SSB/RACH with SSB Index FIG. 8 illustrates a configuration example (part 2) of SSB/RACH according to Operation Example 2. As illustrated in FIG. 8, resources for the SSBs corresponding to the SSB indexes are prepared as transmission candidates.

The BS 100 transmits only the selected base station antenna beam (SSB index). A difference from (Configuration 1) is that although the transmission candidates corresponding to a plurality of base station antenna beams are allocated to slots, only the selected base station antenna beam is transmitted.

Similarly to (Configuration 1), in a case where the direction of the UE 200B is changed, the SSB index to be transmitted may also be changed. An SSB transmission period may be, for example, 5, 10, 20, 40, 80, or 160 msec, similarly to (Configuration 1).

As for the RACH, ROs corresponding to the SSB indexes are prepared, but only an RO corresponding to the selected base station antenna beam is allocated as an RO resource.
(Configuration 3): Case where (Configuration 1) and (Configuration 2) are Combined For example, (Configuration 1) may be adopted for the SSB, and (Configuration 2) may be adopted for the RACH.

(3.2.3) Operation Example 3

In this operation example, the radio base station (BS 100) notifies the terminal (UE 200A or UE 200B) of a change in direction of the antenna beam of the radio base station.

Figure 9:
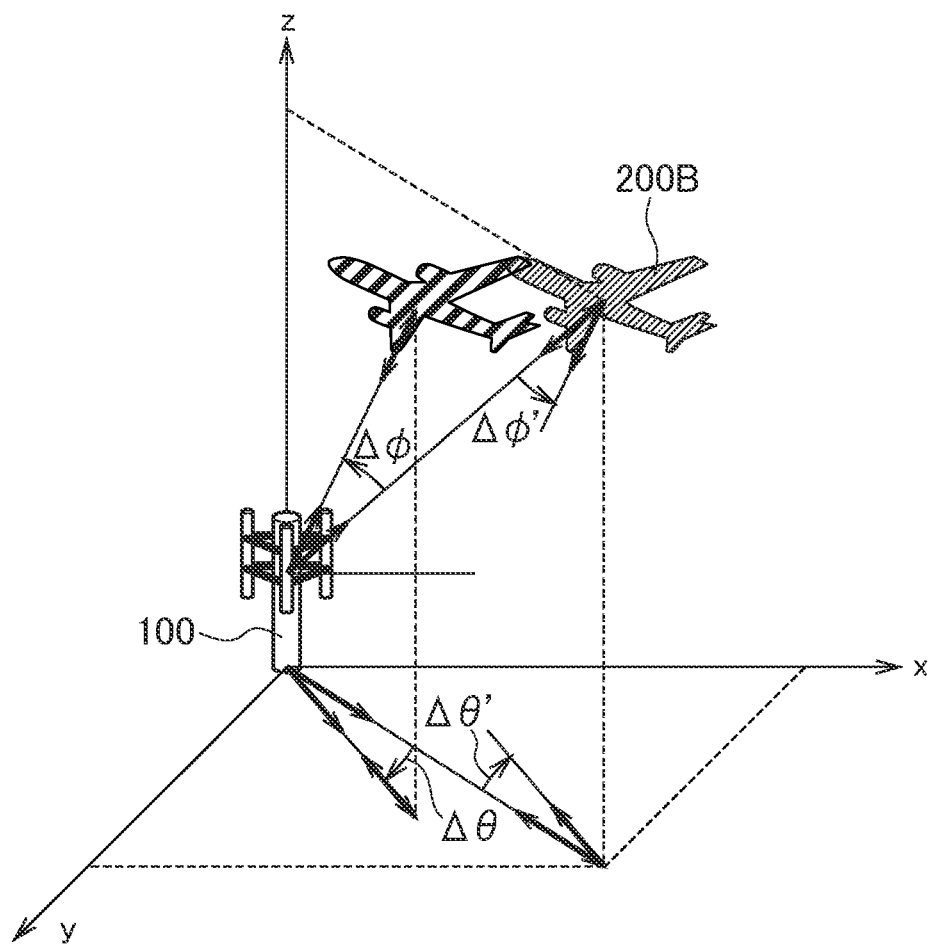
FIG. 9 is a diagram illustrating an example (a case where the UE 200B moves) of a change in direction of an antenna beam of the BS 100 according to Operation Example 3.
Figure 10:
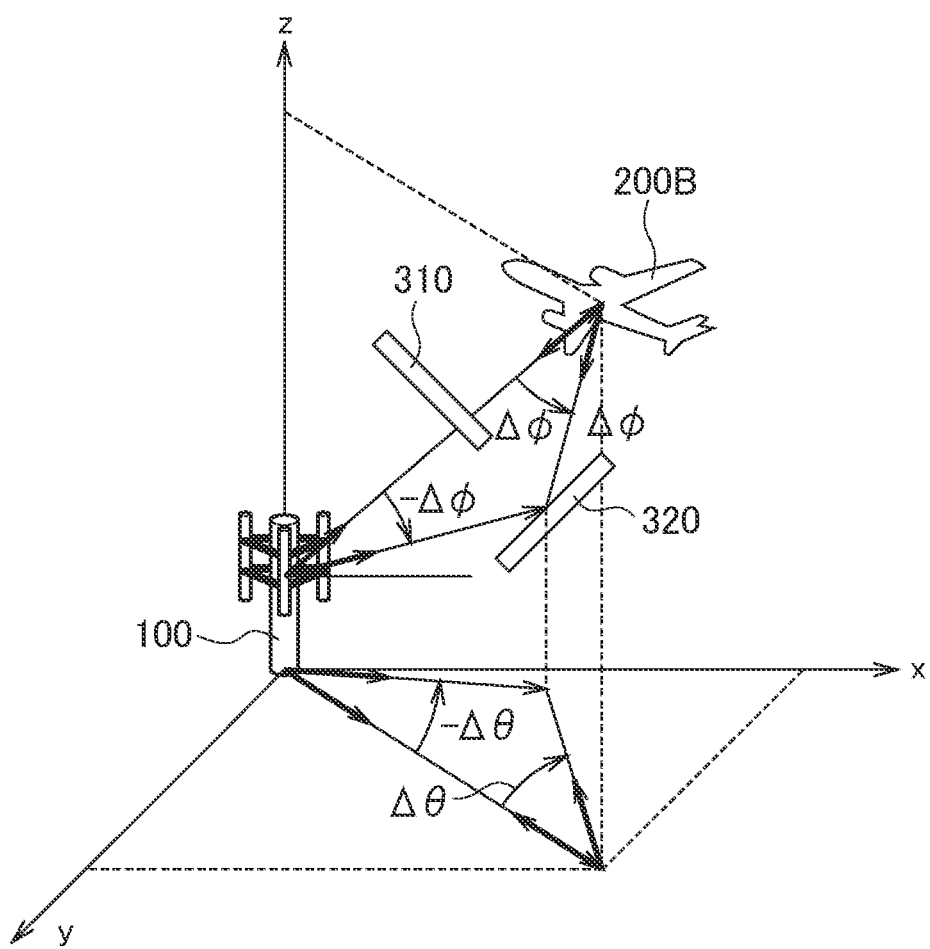
FIG. 10 is a diagram illustrating an example (a case where a path is changed due to blocking) of a change in direction of an antenna beam of the BS 100 according to Operation Example 3.

FIG. 9 illustrates an example (a case where the UE 200B moves) of a change in direction of an antenna beam of the BS 100 according to Operation Example 3. FIG. 10 illustrates an example (a case where a path is changed due to blocking) of a change in direction of an antenna beam of the BS 100 according to Operation Example 3.

The BS 100 can notify the UE 200B of directions ($\Delta\varphi$ and $\Delta\theta$) of a change of a base station antenna beam. Similarly, the UE 200B can notify the BS 100 of directions of a change of a mobile station antenna beam. The notification may be made periodically or only when a change occurs.

The BS 100 (UE 200B) changes the base station antenna beam (mobile station antenna beam) according to a change of the base station antenna beam (mobile station antenna beam).

Further, as illustrated in FIG. 9, when the UE 200B moves (when the terminal location information is changed), the UE 200B may change ($\Delta\varphi'$ and $\Delta\theta'$), based on change amounts ($\Delta\varphi$ and $\Delta\theta$) of the base station antenna beam, directions of the mobile antenna beam to directions corresponding to the same amounts as the change amounts.

On the other hand, as illustrated in FIG. 10, when a path is changed due to blocking by an obstacle 310 (when the terminal location information is not changed), the BS 100 may change ($-\Delta\varphi$ and $-\Delta\theta$), based on change amounts of the base station antenna beam, directions of the base station antenna beam to reverse directions corresponding to the same amounts as the change amounts.

By changing the directions of the base station antenna beam to the reverse directions, in a case where an obstacle 320 exists, the base station antenna beam may be reflected by the obstacle 320 toward the UE 200B and reach the UE 200B.

Further, a cause (a case where the UE 200B moves or a case where the path is changed due to blocking) of such an antenna beam change may be judged by any of the following.

(i) The judgement is made based on a change in location information of the UE 200B (in a case where the terminal location information is not changed, it may be judged that the cause is a path change).

(ii) The judgement is made based on received power in the BS 100 or the UE 200B (in a case where a change in received power exceeds, for example, xdB, it may be judged that the cause is a path change). Note that the received power may be a Received Signal Strength Indicator (RSSI) or, if applicable, may be Reference Signal Received Power (RSRP).

As the change amounts of the base station antenna beam (mobile station antenna beam), respective values (angles) in the horizontal direction ($\theta$) and the vertical direction ($\varphi$) may be notified. For example, the change amounts may be two values of ±5 degrees (two bits in total) or four values of ±5 degrees and ±10 degrees (four bits in total).

Further, the notification of the change amounts may be made by any of the following.

(When the BS 100 Notifies)

Downlink control information (DCI), a MAC layer control element (MAC-CE), Transmission Configuration Indication (TCI), or a Channel State Information Reference Signal (CSI-RS) can be used.

In a case of using the DCI, any existing field (for example, reserved bit) may be replaced. Alternatively, a new field indicating the change amounts may be added.

Even in a case of using the MAC-CE, any existing field (for example, reserved bit) may be replaced, or a new field indicating the change amounts may be added.

In a case of using the CSI-RS, a resource position (for example, l' or k') may be associated with the change amounts. Alternatively, a sequence pattern (for example, sequenceGenerationConfig) may be associated with the change amounts.

(When the UE 200B (or the UE 200A) Notifies)

Uplink control information (UCI), a MAC-CE, a Sounding Reference Signal (SRS), a PRACH, or a measurement report can be used.

In a case of using the UCI, a bit for notification of the change amounts may be added to Hybrid automatic repeat request-Acknowledgement (HARQ-ACK) of 3GPP Release-15/16, a scheduling request (SR), or a CSI bit. The following information may be added to the UCI.

Bit for notification of change amounts of interfering station

HARQ-ACK, SR, power control of interfering station, and combination of HARQ-ACK, CSI, and notification of change amounts Combination of HARQ-ACK, SR, CSI, and notification of change amounts In a case of using the MAC-CE, any existing field (for example, reserved bit) may be replaced, or a new field indicating the change amounts may be added.

In a case of using the SRS, a resource position (for example, l' or k') may be associated with the change amounts. Alternatively, a sequence pattern (for example, startPosition ($l_{offset}$)) may be associated with the change amounts.

In a case of using the PRACH, a resource position (for example, msg1-FrequencyStart) may be associated with the change amounts. Alternatively, a sequence pattern (for example, sequence number) may be associated with the change amounts.

In a case of making notification by using the measurement report, for example, a notification field for the change amounts may be added to MeasResults IE.

(4) Actions/Effects

According to the above-described embodiment, the following actions and effects can be obtained. Specifically, the BS 100 can select an antenna beam (base station antenna beam) for the UE 200A transmitted from the BS 100, based on the terminal location information indicating the location of the UE 200A (or the UE 200B, hereinafter, the same applies).

Therefore, even when the number of combinations of antenna beams of the BS 100 and the UE 200A is increased as N×M, it is possible to rapidly select an appropriate antenna beam even when there are many combinations of the antenna beams, by utilizing the terminal location information. As a result, it is possible to contribute to the performance of the entire radio communication system 10, in particular, to rapid establishment of connection (RRC connection).

In the present embodiment, the BS 100 can transmit the base station location information indicating the location of the BS 100 to the UE 200A. Therefore, the UE 200A can rapidly select an appropriate antenna beam.

Further, the BS 100 can transmit, to the UE 200A, the change information indicating a change in direction of the base station antenna beam. Therefore, even after the appropriate antenna beam is once selected, an appropriate direction of the antenna beam can be rapidly selected.

Further, in the present embodiment, similarly to the BS 100, the UE 200A can also select an antenna beam for the BS 100 to be transmitted from the UE 200A, based on the base station location information. Therefore, an appropriate antenna beam can be rapidly selected, and it is possible to contribute to the performance of the entire radio communication system 10, in particular, to rapid establishment of connection (RRC connection).

(5) Other Embodiments

Although the embodiment has been described above, the present invention is not limited to the description of the embodiment, and it is obvious to those skilled in the art that various modifications and improvements can be made.

For example, in the above-described embodiment, a case where the number of combinations of antenna beams of the BS 100 and the UE 200A is increased as N×M, in particular, a case where a high frequency band beyond 52.6 GHz is used has been described as an example. However, the radio communication system 10 does not necessarily have to use such a high frequency band.

Further, the number of combinations of the antenna beams does not necessarily have to be N×M, and may be M=1, for example.

Moreover, the block diagrams (FIGS. 2 and 3) used for describing the embodiments illustrate blocks of functional unit. Those functional blocks (structural components) are realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired or wireless) to each other, and each functional block may be realized by these plural devices. The functional blocks may be realized by combining software with the one device or the plural devices mentioned above.

Functions include determining, judging, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting is called a transmitting unit or a transmitter. For any of the above, as described above, the realization method is not particularly limited to any one method.

Figure 11:
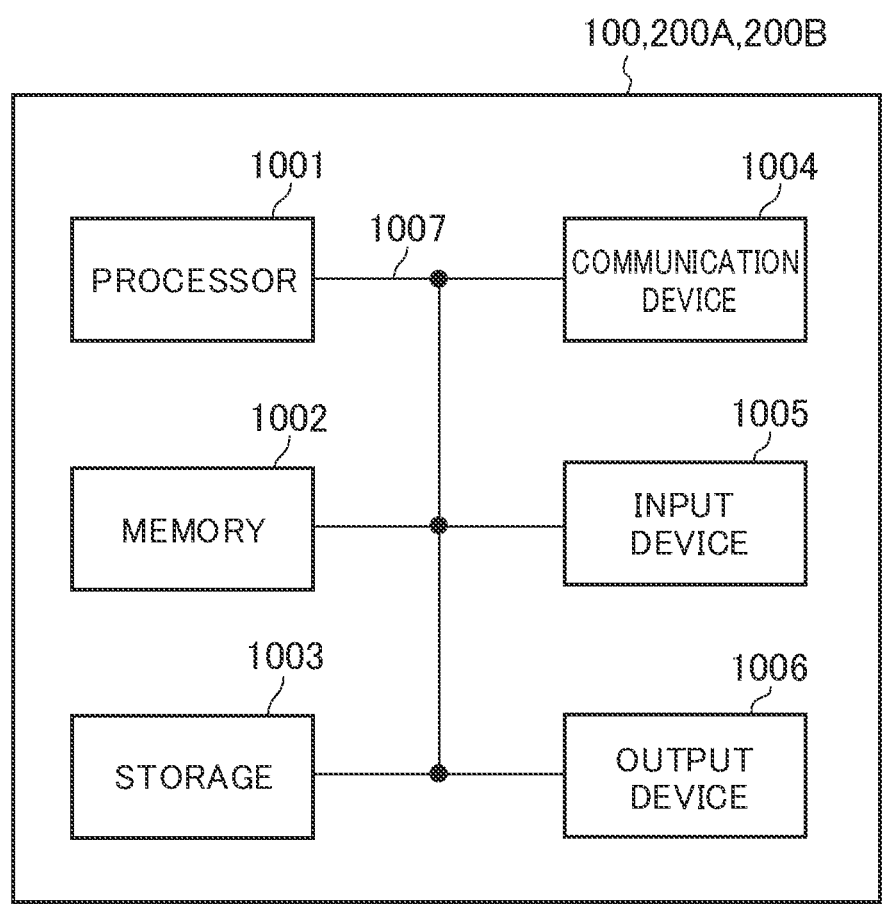
FIG. 11 is a diagram illustrating an example of a hardware configuration of the BS 100, the UE 200A, and the UE 200B.

Furthermore, the BS 100, the UE 200A, and the UE 200B (the device) described above may function as a computer that performs the processing of the radio communication method of the present disclosure. FIG. 11 is a diagram illustrating an example of a hardware configuration of the device. As illustrated in FIG. 11, the device may be configured as a computer device including a processor 1001, a memory 1002, a storage 1003, a communication device 1004, an input device 1005, an output device 1006, a bus 1007, and the like.

Furthermore, in the following description, the term "device" can be replaced with a term such as "circuit", "device", or "unit". A hardware configuration of the device may be constituted by including one or plurality of the devices illustrated in the figure, or may be constituted without including some of the devices.

Each functional block (FIGS. 2 and 3) of the device is realized by any of hardware elements of the computer device or a desired combination of the hardware elements.

Moreover, the processor 1001 performs operation by loading predetermined software (program) on hardware such as the processor 1001 and the memory 1002, controls communication via the communication device 1004, and controls reading and/or writing of data on the memory 1002 and the storage 1003, thereby realizing various functions of the device.

The processor 1001, for example, operates an operating system to control the entire computer. The processor 1001 may be configured with a central processing unit (CPU) including an interface with a peripheral device, a control device, an operation device, a register, and the like.

Moreover, the processor 1001 reads a program (program code), a software module, data, and the like from the storage 1003 and/or the communication device 1004 into the memory 1002, and performs various types of processing according to the data. As the program, a program that is capable of executing on the computer at least a part of the operation described in the above embodiments is used. Alternatively, various types of processing described above may be performed by one processor 1001 or may be performed simultaneously or sequentially by two or more processors 1001. The processor 1001 may be implemented by using one or more chips. Alternatively, the program may be transmitted from a network via a telecommunication line.

The memory 1002 is a computer readable recording medium and may be configured, for example, with at least one of Read Only Memory (ROM), Erasable Programmable ROM (EPROM), Electrically Erasable Programmable ROM (EEPROM), Random Access Memory (RAM), and the like. The memory 1002 may be called register, cache, main memory (main storage device), and the like. The memory 1002 can store therein a program (program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, or a Blu-ray (Registered Trademark) disk), a smart card, a flash memory (for example, a card, a stick, or a key drive), a floppy (Registered Trademark) disk, a magnetic strip, and the like. The storage 1003 may be called an auxiliary storage device. The recording medium may be, for example, a database including the memory 1002 and/or the storage 1003, a server, or other appropriate media.

The communication device 1004 is hardware (transmission/reception device) capable of performing communication between computers via a wired and/or wireless network. The communication device 1004 is also called, for example, a network device, a network controller, a network card, a communication module, or the like.

The communication device 1004 may include a radio-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 may be constituted by a single bus or may be constituted by separate buses between the devices.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by the hardware. For example, the processor 1001 may be implemented by using at least one of these types of hardware.

Notification of information is not limited to that described in the aspect/embodiment in the present disclosure, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB) and System Information Block (SIB)), other signals, or a combination thereof. The RRC signaling may be called RRC message, and may be, for example, an RRC Connection Setup message or an RRC Connection Reconfiguration message.

Each of the aspects/embodiments described in the present disclosure may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the aspects/embodiments described in the present disclosure may be exchanged. For example, the various steps and the sequence of the steps of the methods described in the present disclosure are exemplary and are not limited to the specific order described above.

The specific operation that is performed by the base station in the present disclosure may be performed by its upper node in some cases. In a network constituted by one or more network nodes having a base station, the various operations performed for communication with the terminal can be performed by at least one of the base station and other network nodes other than the base station (for example, MME, S-GW, and the like may be considered, but not limited thereto). In the above, an example in which there is one network node other than the base station is described; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input/output information may be stored in a specific location (for example, a memory) or may be managed in a management table. The information to be input/output can be overwritten, updated, or added. The information may be deleted after outputting. The inputted information may be transmitted to another device.

The determination may be made by a value (0 or 1) represented by one bit or by a Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, and it may be performed implicitly (for example, without notifying the predetermined information).

Instead of being referred to as software, firmware, middleware, microcode, hardware description language, or some other names, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when software is transmitted from a website, a server, or some other remote sources by using at least one of a wired technology (coaxial cable, optical fiber cable, twisted pair, Digital Subscriber Line (DSL), or the like) and a wireless technology (infrared light, microwave, or the like), at least one of these wired and wireless technologies is included within the definition of the transmission medium.

Information, signals, or the like described in the present disclosure may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (CC) may be referred to as a carrier frequency, a cell, a frequency carrier, or the like.

The terms "system" and "network" used in the present disclosure are used interchangeably.

Furthermore, the information, the parameter, and the like described in the present disclosure may be represented by an absolute value, may be expressed as a relative value from a predetermined value, or may be represented by corresponding other information. For example, the radio resource may be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information elements can be identified by any suitable name, the various names assigned to these various channels and information elements shall not be restricted in any way.

In the present disclosure, it is assumed that "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, a communication service can be provided by a base station subsystem (for example, a small base station for indoor use (Remote Radio Head: RRH)).

The term "cell" or "sector" refers to a part or all of the coverage area of a base station and/or a base station subsystem that performs the communication service in this coverage.

In the present disclosure, the terms "mobile station (MS)", "user terminal", "user equipment (UE)", "terminal" and the like can be used interchangeably.

The mobile station may be called by those skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable terms.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter, the same applies). For example, each of the aspects/embodiments of the present disclosure may be applied to a configuration that allows communication between a base station and a mobile station to be replaced with communication between a plurality of mobile stations (which may be referred to as, for example, Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side").

For example, terms such as an uplink channel, a downlink channel, or the like may be read as a side channel.

Likewise, a mobile station in the present disclosure may be read as a base station. In this case, the base station may have the function of the mobile station.

A radio frame may be configured with one or more frames in time domain. Each of one or more frames in the time domain may also be referred to as a subframe. The subframe may be configured with one or more slots in the time domain. The subframe may be a fixed time length (for example, 1 ms) that does not depend on numerology.

The numerology may be a communication parameter applied to at least one of transmission or reception of a certain signal or channel. The numerology may represent, for example, at least one of a subcarrier spacing (SCS), a bandwidth, a symbol length, a cyclic prefix length, a Transmission Time Interval (TTI), the number of symbols per TTI, a radio frame configuration, specific filtering processing performed by a transceiver in frequency domain, or specific windowing processing performed by the transceiver in the time domain.

The slot may be configured with one or more symbols (Orthogonal Frequency Division Multiplexing (OFDM) symbols, Single Carrier Frequency Division Multiple Access (SC-FDMA) symbols, and the like) in the time domain. The slot may be a unit of time based on the numerology.

The slot may include a plurality of minislots. Each minislot may be configured with one or more symbols in the time domain. Further, the minislot may also be called a subslot. The minislot may be configured with fewer symbols than those of slots. A PDSCH (or PUSCH) transmitted in a time unit larger than the minislot may be called a PDSCH (or PUSCH) mapping type A. A PDSCH (or PUSCH) transmitted using the minislot may be called a PDSCH (or PUSCH) mapping type B.

Each of the radio frame, subframe, slot, minislot, and symbol represents a time unit for transmitting a signal. Different names may be used for the radio frame, subframe, slot, minislot, and symbol, respectively.

For example, one subframe may be called a transmission time interval (TTI), a plurality of consecutive subframes may be called a TTI, and one slot or one minislot may be called a TTI. That is, at least one of the subframe or the TTI may be a subframe (1 ms) in the existing LTE, a period shorter than 1 ms (for example, 1 to 13 symbols), or a period longer than 1 ms. Note that a unit representing the TTI may also be called a slot, a minislot, or the like, instead of a subframe.

Here, the TTI refers to a minimum time unit of scheduling in radio communication, for example. For example, in the LTE system, a base station performs scheduling to allocate radio resources (frequency bandwidth, transmission power, or the like that can be used in each user terminal) to each user terminal in units of TTI. Note that the definition of the TTI is not limited thereto.

The TTI may be a transmission time unit such as a channel-coded data packet (transport block), a code block, or a codeword, or may be a processing unit such as scheduling or link adaptation. Note that, when a TTI is given, a time interval (for example, the number of symbols) in which a transport block, a code block, a codeword, or the like is actually mapped may be shorter than the TTI.

Note that, in a case where one slot or one minislot is called a TTI, one or more TTIs (that is, one or more slots or one or more minislots) may be a minimum time unit of scheduling. Further, the number of slots (the number of minislots) constituting the minimum time unit of the scheduling may be controlled.

A TTI having a time length of 1 ms may be called a normal TTI (TTI in LTE Rel. 8 to 12), a normal TTI, a long TTI, a normal subframe, a normal subframe, a long subframe, a slot, or the like. A TTI shorter than the normal TTI may be called a shortened TTI, a short TTI, a partial or fractional TTI, a short subframe, a minislot, a subslot, a slot, or the like.

Note that the long TTI (for example, the normal TTI or the subframe) may be read as a TTI having a time length exceeding 1 ms, and the short TTI (for example, the shortened TTI) may be read as a TTI having a TTI length of less than the TTI length of the long TTI and equal to or more than 1 ms.

The resource block (RB) is a resource allocation unit in the time domain and the frequency domain, and may include one or a plurality of consecutive subcarriers in the frequency domain. The number of subcarriers included in the RB may be the same regardless of the numerology, for example, twelve. The number of subcarriers included in the RB may be determined based on the numerology.

Further, the time domain of the RB may include one or a plurality of symbols, and may have a length of one slot, one minislot, one subframe, or one TTI. One TTI, one subframe, or the like may be configured with one or a plurality of resource blocks.

Note that one or a plurality of RBs may also be called physical resource blocks (PRB), subcarrier groups (SCG), resource element groups (REG), PRB pairs, RB pairs, or the like.

Further, the resource block may also be configured with one or a plurality of resource elements (RE). For example, one RE may be a radio resource region of one subcarrier and one symbol.

The bandwidth part (BWP) (which may also be called a partial bandwidth, or the like) may represent a certain subset of continuous common resource blocks (RBs) for the numerology in a certain carrier. Here, the common RB may be specified by an RB index based on a common reference point of the carrier. The PRB may be defined in a certain BWP and numbered within the BWP.

The BWP may include a BWP (UL BWP) for UL and a BWP (DL BWP) for DL. One or a plurality of BWPs may be configured in one carrier for UE.

At least one of the configured BWPs may be active, and the UE does not have to expect to transmit and receive a predetermined signal/channel outside the active BWP. Note that "cell", "carrier", and the like in the present disclosure may be read as "BWP".

The above-described structures such as a radio frame, a subframe, a slot, a minislot, and a symbol are merely examples. For example, the configuration such as the number of subframes included in a radio frame, the number of slots per subframe or radio frame, the number of minislots included in a slot, the number of symbols and RBs included in a slot or minislot, the number of subcarriers included in an RB, the number of symbols in a TTI, a symbol length, and a cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency domain, the microwave region, and the light (both visible and invisible) region, and the like.

The reference signal may be abbreviated as RS and may be called pilot according to applicable standards.

As used in the present disclosure, the phrase "based on" does not mean "based only on" unless explicitly stated otherwise. In other words, the phrase "based on" means both "based only on" and "based at least on".

A term "means" in the configuration of each device described above may be replaced with a term such as "unit", "circuit", or "device".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in any other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout the present disclosure, for example, during translation, if articles such as "a", "an", and "the" in English are added, in the present disclosure, these articles may include a plurality of nouns following these articles.

The term "determining" used in the present disclosure may encompass a wide variety of operations. The term "determining" can include, for example, judging, calculating, computing, processing, deriving, investigating, looking up, search, inquiry (for example, searching in a table, database, or other data structure), and ascertaining. In addition, "determining" can include receiving (for example, receiving information), transmitting (for example, transmitting information), inputting, outputting, and accessing (for example, accessing data in a memory), and the like. In addition, "determining" can include "resolving", "selecting", "choosing", "establishing", "comparing", and the like. In other words, the term "determining" can include any operation. Further, the term "determining" may also be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN

100 BS
110 Radio transmitting unit
120 Radio receiving unit
130 Location information processing unit
140 Beam control unit
150 Beam information transmitting unit
200A, 200B UE
210 Radio transmitting unit
220 Radio receiving unit
230 Location information processing unit
240 Beam control unit
250 Beam information transmitting unit
310, 320 Obstacle
BM Beam
1001 Processor
1002 Memory
1003 Storage
1004 Communication device
1005 Input device
1006 Output device
1007 Bus

The invention claimed is:

1. A radio base station comprising:
a receiver that receives, from a terminal, terminal location information indicating a location of the terminal;
a processor that selects, among a plurality of candidate antenna beams, an antenna beam for the terminal to be transmitted from the radio base station in a direction closest to a direction in which the terminal is located, based on the terminal location; and
a transmitter that transmits, to the terminal, base station location information indicating a location of the radio base station using the selected antenna beam,
wherein the processor is further configured to:
detect a path change of signal received from the terminal; and
change a direction of the selected antenna beam based on the path change.

2. The radio base station according to claim 1, wherein the transmitter transmits, to the terminal, change information indicating a change in direction of the antenna beam.

3. A terminal comprising:
a receiver that receives, from a radio base station, base station location information indicating a location of the radio base station;
a processor that selects, among a plurality of candidate antenna beams, an antenna beam for the radio base station to be transmitted from the terminal in a direction closest to a direction in which the radio base station is located, based on the radio base station location; and
a transmitter that transmits a physical random access channel (PRACH) to the radio base station using the selected antenna beam,
wherein:
the receiver is further configured to receive change amounts of a radio base station antenna beam direction; and
the processor is further configured to change a direction of the selected antenna beam based on the change amounts.

4. The terminal according to claim 3, wherein the transmitter transmits, to the radio base station, terminal location information indicating a location of the terminal.

* * * * *